United States Patent
Porras et al.

(10) Patent No.: US 9,947,975 B2
(45) Date of Patent: Apr. 17, 2018

(54) BATTERY COOLANT CIRCUIT CONTROL

(71) Applicant: Ford Global Technologies, LLC, Dearborn, MI (US)

(72) Inventors: Angel Fernando Porras, Dearborn, MI (US); Timothy Noah Blatchley, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/200,025

(22) Filed: Jul. 1, 2016

(65) Prior Publication Data

US 2018/0006347 A1    Jan. 4, 2018

(51) Int. Cl.
| | |
|---|---|
| *H01M 10/633* | (2014.01) |
| *H01M 10/625* | (2014.01) |
| *H01M 10/617* | (2014.01) |
| *H01M 10/6568* | (2014.01) |
| *H01M 10/663* | (2014.01) |
| *H01M 10/48* | (2006.01) |

(52) U.S. Cl.
CPC ....... *H01M 10/633* (2015.04); *H01M 10/486* (2013.01); *H01M 10/617* (2015.04); *H01M 10/625* (2015.04); *H01M 10/6568* (2015.04); *H01M 10/663* (2015.04); *H01M 2220/20* (2013.01)

(58) Field of Classification Search
CPC ............. H01M 10/633; H01M 10/617; H01M 10/625; H01M 10/486; H01M 10/6568; H01M 2220/20
See application file for complete search history.

(56) References Cited

U.S. PATENT DOCUMENTS

| | | | |
|---|---|---|---|
| 4,415,847 A * | 11/1983 | Galloway | H01M 10/365 |
| | | | 165/300 |
| 6,276,152 B1 | 8/2001 | Sibik | |
| 7,971,447 B2 | 7/2011 | Maitre | |
| 8,402,776 B2 | 3/2013 | Johnston et al. | |
| 2009/0249807 A1 | 10/2009 | Nemesh et al. | |
| 2009/0280395 A1* | 11/2009 | Nemesh | B60H 1/00278 |
| | | | 429/62 |
| 2009/0317697 A1* | 12/2009 | Dogariu | B60H 1/00278 |
| | | | 429/62 |
| 2010/0009246 A1 | 1/2010 | Maitre et al. | |

(Continued)

*Primary Examiner* — Carlos Barcena
(74) *Attorney, Agent, or Firm* — David Kelley; Brooks Kushman, P.C.

(57) ABSTRACT

A vehicle includes a traction battery arranged to be cooled by a chiller of a refrigerant system, and a radiator of a coolant system. The coolant system includes a proportioning valve having a pair of first and second outlets that each selectively receives a proportion of coolant flowing into the valve depending upon a position of the valve. The coolant system further includes a chiller loop connected to the first outlet and arranged to convey coolant to the chiller, and a radiator loop connected to the second outlet and arranged to convey coolant to the radiator. A controller is configured to, in response to the refrigerant system being ON, actuate the proportioning valve to proportion the coolant between the first and second outlets such that heat transfer through the chiller is limited to a chiller capacity.

18 Claims, 5 Drawing Sheets

(56) References Cited

U.S. PATENT DOCUMENTS

| | | | |
|---|---|---|---|
| 2012/0225341 A1* | 9/2012 | Major | B60H 1/00278 |
| | | | 429/120 |
| 2012/0297809 A1 | 11/2012 | Carpenter | |
| 2013/0298583 A1 | 11/2013 | O'Donnell et al. | |
| 2014/0216709 A1 | 8/2014 | Smith et al. | |
| 2014/0326430 A1 | 11/2014 | Carpenter et al. | |

* cited by examiner

| Blower Speed (%) | Ambient Air Temperature (Deg C) | | | | | | | |
|---|---|---|---|---|---|---|---|---|
| | 10 | 15 | 20 | 25 | 30 | 35 | 40 | 45 |
| 0 | 0 | 0 | 10 | 20 | 25 | 30 | 40 | 45 |
| 10 | 0 | 10 | 10 | 20 | 25 | 30 | 40 | 45 |
| 20 | 10 | 10 | 15 | 20 | 30 | 35 | 40 | 50 |
| 30 | 15 | 20 | 25 | 30 | 35 | 40 | 50 | 55 |
| 40 | 25 | 20 | 30 | 40 | 50 | 55 | 60 | 65 |
| 50 | 20 | 30 | 40 | 45 | 50 | 55 | 60 | 65 |
| 60 | 30 | 30 | 40 | 50 | 60 | 65 | 70 | 75 |
| 70 | 30 | 40 | 50 | 60 | 65 | 75 | 80 | 80 |
| 80 | 35 | 40 | 50 | 60 | 70 | 80 | 90 | 90 |
| 90 | 40 | 50 | 60 | 70 | 80 | 90 | 95 | 100 |
| 100 | 45 | 50 | 60 | 70 | 80 | 90 | 100 | 100 |

FIG. 3

| Load | Temperature Differential | | | | | | | | |
|---|---|---|---|---|---|---|---|---|---|
| | -0.5 | -0.25 | 0 | 0.5 | 1 | 2 | 3 | 4 | 5 |
| 0 | 3 | 3 | 3 | 3 | 2 | 1 | 0 | 0 | 0 |
| 10 | 3 | 3 | 3 | 3 | 2 | 1 | 0 | 0 | 0 |
| 20 | 3 | 3 | 3 | 3 | 2 | 1 | 0 | 0 | 0 |
| 30 | 3 | 3 | 3 | 2 | 1 | 1 | 0 | 0 | 0 |
| 40 | 3 | 3 | 3 | 2 | 1 | 1 | 0 | 0 | 0 |
| 50 | 3 | 3 | 3 | 2 | 1 | 0 | 0 | 0 | 0 |
| 60 | 3 | 3 | 3 | 2 | 1 | 0 | 0 | 0 | 0 |
| 70 | 3 | 3 | 3 | 2 | 1 | 0 | 0 | 0 | 0 |
| 80 | 3 | 3 | 2 | 2 | 1 | 0 | 0 | 0 | 0 |
| 90 | 3 | 3 | 2 | 1 | 1 | 0 | 0 | 0 | 0 |
| 100 | 3 | 3 | 2 | 1 | 1 | 0 | 0 | 0 | 0 |

BATTERY COOLANT CIRCUIT CONTROL

TECHNICAL FIELD

The present disclosure relates to a control strategy and method for operating a valve of a battery-coolant system to control coolant flow to a battery chiller associated with an air-conditioning system of a vehicle.

BACKGROUND

The need to reduce fuel consumption and emissions in automobiles and other vehicles is well known. Vehicles are being developed that reduce, or completely eliminate, reliance on internal-combustion engines. Electric and hybrid vehicles are one type of vehicle currently being developed for this purpose. Electric and hybrid vehicles include a traction motor that is powered by a traction battery. The traction battery requires a thermal-management system to thermally regulate the temperate of the battery cells.

SUMMARY

According to one embodiment, a vehicle includes a traction battery, a refrigerant system including a chiller, and a coolant system. The coolant system has conduit arranged to circulate coolant through the chiller and a radiator, and a valve configured to selectively direct coolant to at least one of the chiller and radiator. A controller is configured to, in response to the refrigerant system being ON, actuate the valve to route a proportion of coolant to the chiller based on a chiller capacity.

According to another embodiment, a vehicle includes a traction battery; a refrigerant system having a compressor, a condenser, a battery chiller, and a cabin evaporator; and a coolant system. The coolant system includes a proportioning valve having an inlet connected in fluid communication with an outlet side of the battery, and a pair of first and second outlets. The valve is configured such that each of the outlets selectively receives a proportion of coolant flowing into the inlet depending upon a position of the valve. The coolant system further includes a chiller loop connected in fluid communication with the first outlet of the proportioning valve, and arranged to convey coolant between the battery and the chiller to transfer heat from the coolant system to the refrigerant system. The coolant system also includes a radiator loop connected in fluid communication with the second outlet of the proportioning valve, and arranged to convey coolant between the battery and a radiator to transfer heat from the coolant system to the outside air. A vehicle controller is configured to, in response to the refrigerant system being ON, actuate the proportioning valve to proportion the coolant between the first and second outlets such that heat transfer through the chiller is limited to a chiller capacity.

According to yet another embodiment, a method of controlling a thermal-management system of a traction battery is presented. The method includes activating a refrigerant subsystem such that refrigerant circulates through a chiller and an evaporator. The method further includes activating a battery-coolant subsystem such that coolant circulates through the traction battery, a radiator, the chiller, and a proportioning valve. The method also includes actuating the proportioning valve such that the coolant is proportioned between the radiator and the chiller based on chiller capacity.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
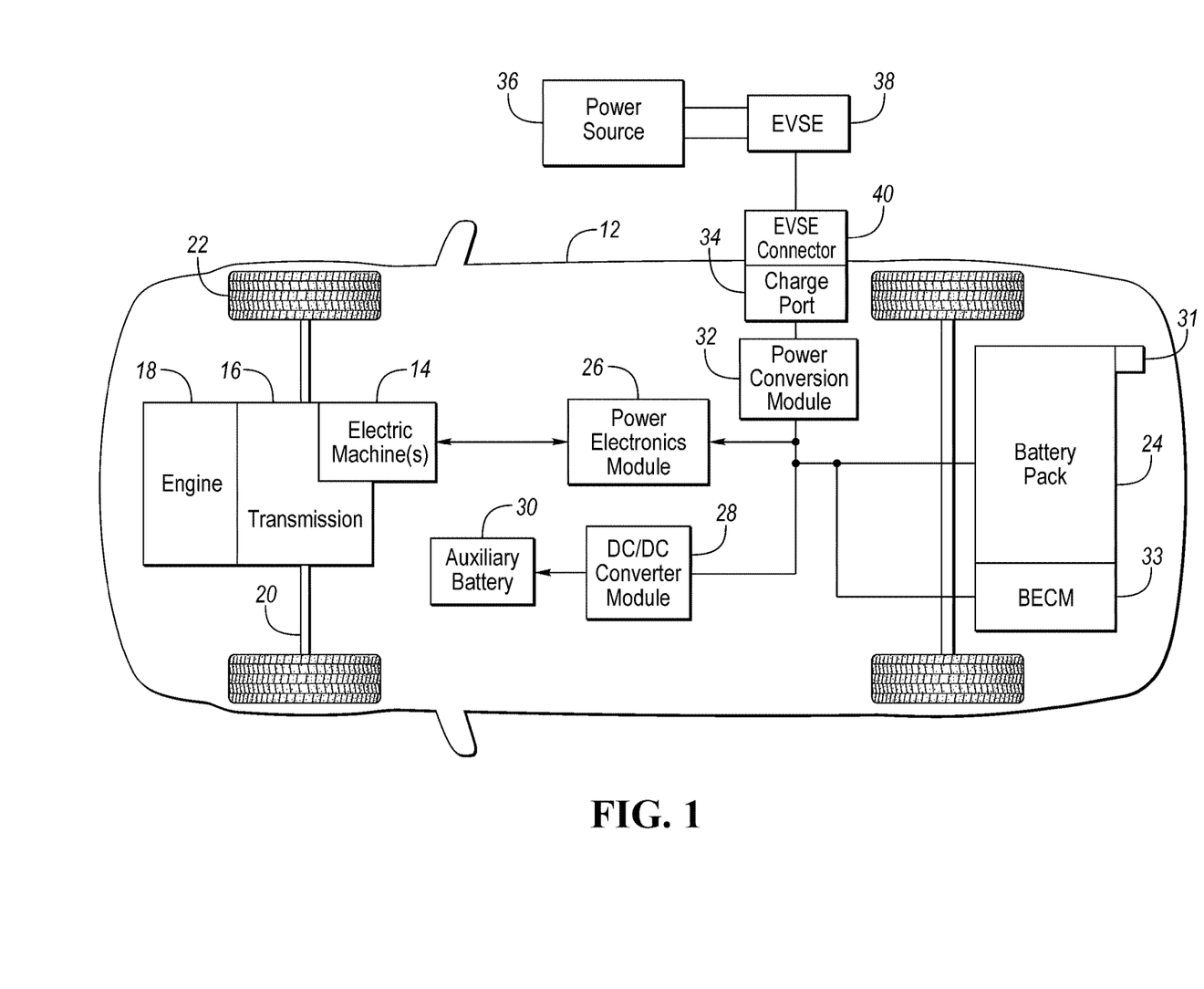
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully-electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal-management system. Examples of thermal-management systems include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power-electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers.

Figure 2:
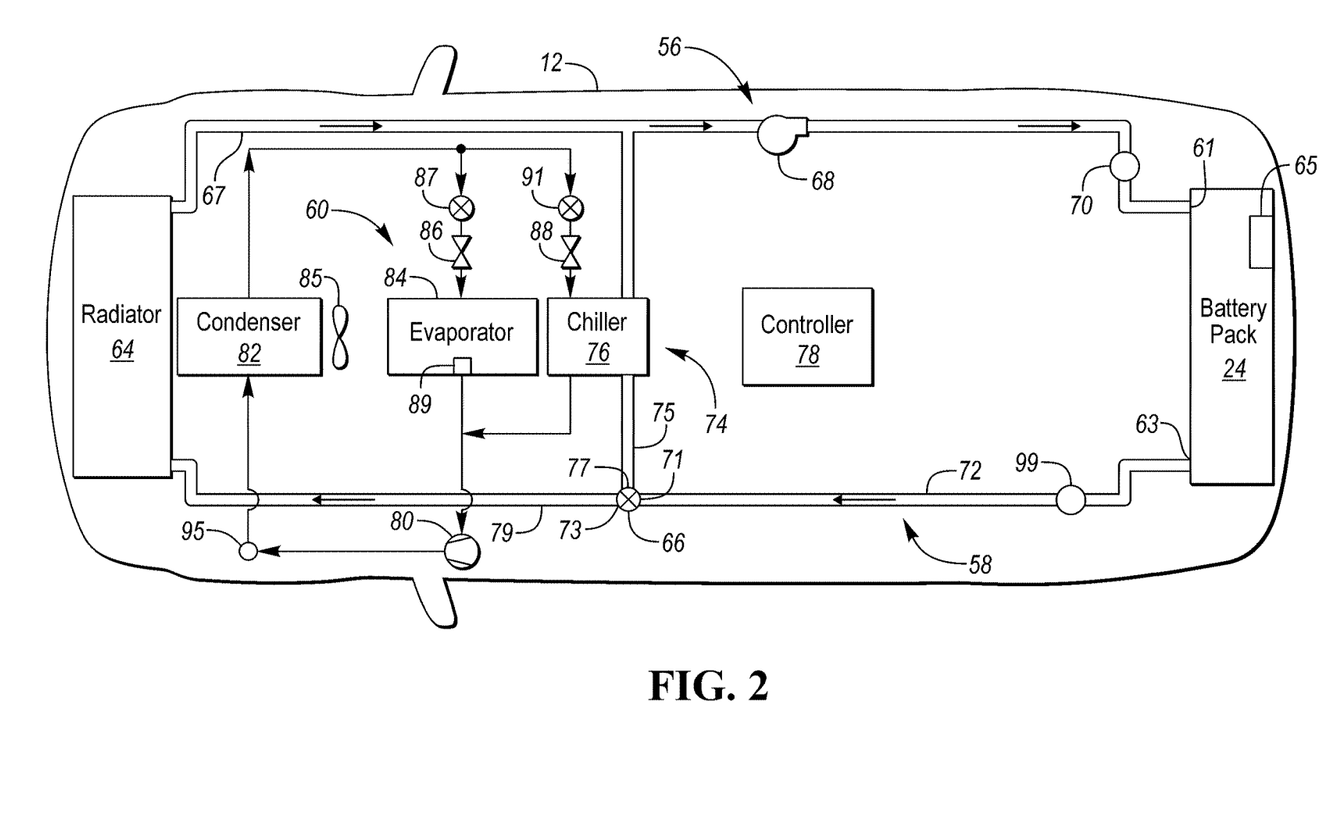
FIG. 2 is a schematic diagram of a battery thermal-management system and a climate control-system of a vehicle.

The traction battery 24 and other vehicle component are thermally regulated with one or more thermal-management systems. Example thermal-management systems are shown in the figures and described below. Referring to FIG. 2, a vehicle 12 includes a thermal-management system 56. The thermal-management system 56 can be employed to manage thermal loads generated by various vehicle components, such as the battery assembly 24, powertrain components, and power-electronic components. For example, the thermal-management system 56 can selectively circulate coolant to the battery assembly 24 to either cool or heat the battery assembly depending on operating conditions.

The thermal-management system 56 may include one or more vehicle controllers 78. While schematically shown as a single module in the illustrated embodiment, the controller 78 may be part of a larger control system and may be controlled by various other controllers throughout the vehicle, such as a vehicle-system controller (VSC) that includes a powertrain control unit, a transmission control unit, an engine control unit, a BECM, etc. It should be understood that the controller 78 and one or more other controllers can collectively be referred to as "a controller" that controls, such as through a plurality of integrated algorithms, various actuators in response to signals from various sensors to control functions associated with the vehicle, and in this case, with a thermal-management system 56. The various controllers that make up the VSC can communicate with one another using a common bus protocol (e.g., CAN).

In one embodiment, the battery thermal-management system 56 includes a coolant subsystem 58 and a refrigerant subsystem 60. These two loops may operate in tandem or independently of each other depending upon the battery cooling requirements, the ambient-air temperature, and other factors. The refrigerant subsystem 60 may be a vapor-compression heat pump that circulates a refrigerant transferring thermal energy to various components of the climate-control system. The refrigerant subsystem 60 may be the air-conditioning (AC) system for the cabin. Utilizing the cabin AC may be more cost effective than having a dedicated refrigerant system for the traction battery 24. The coolant subsystem 58, or coolant loop, circulates coolant to the battery assembly 24. The coolant may be a conventional type of coolant mixture, such as water mixed with ethylene glycol. Other coolants could also be used by the coolant subsystem 58. The coolant subsystem 58 may include a radiator 64, a proportioning valve 66, a pump 68, an inlet coolant temperature sensor 70, the battery 24, an outlet coolant temperature sensor 99 and a chiller 76. The coolant subsystem 58 may also include additional components.

In operation, warm coolant exits an outlet 63 of the battery 24. The warm coolant is circulated to the radiator 64 via line 72 when the valve 66 is in a first set of positions. The warm coolant is cooled within the radiator 64 by airflow traveling across the fins to effectuate heat transfer between the airflow and the warm coolant. Cool coolant exits the radiator 64 and enters line 67 for recirculation to the pump 68. The radiator 64 and at least a portion of lines 67 and 79 may be referred to as the radiator loop.

The sensor 70 may be positioned near an inlet 61 of the battery pack 24. The sensor 70 is configured to monitor the temperature of the coolant that is returned to the battery pack 24. In some embodiments, multiple sensors may be used to measure coolant temperature at various locations. The battery pack 24 may also include one more sensors 65. The sensors 65 monitor the temperatures of various battery cells (not shown) of the battery pack 24.

The coolant subsystem 58 includes a chiller loop 74 including a line 75 connected between line 72 and line 67. The line 75 allows coolant to bypass the radiator 64, and instead, circulate through the chiller 76. The valve 66 controls the circulation of coolant through the chiller 76 and the radiator 64. The valve 66 may be a solenoid valve that is electrically controlled by the controller 78. The valve 66 may include a stepper motor for increasing or decreasing the opening of the valve. Other types of valves could alternatively be utilized within the coolant subsystem 58. The valve 66 includes an inlet 71 connected to line 72, a second outlet 73 connected to line 79, and a first outlet 77 connected to line 75. The valve 66 is configured such that each of the outlets 73, 77 selectively receive a proportion, between 0 and 100 percent inclusive, of the coolant flowing through the valve 66 depending upon a position of the valve. By adjusting the proportion of coolant split between the outlets, the amount of coolant flowing through the chiller 76 and the radiator 64 can be controller according to algorithms stored in memory of the controller 78.

The chiller 76 exchanges heat with the refrigerant subsystem 60 to provide a chilled coolant during certain conditions. For example, when the battery temperature exceeds a predefined threshold and the cabin AC system 60 has capacity, the valve 66 may be actuated to circulate at least some coolant to the chiller 76. A portion of the warm coolant from the battery pack 24 may enter the chiller line 75 and exchange heat with a refrigerant of the refrigerant subsystem 60 within the chiller 76 to dissipate heat.

The battery chiller 76 may have any suitable configuration. For example, the chiller 76 may have a plate-fin, tube-fin, or tube-and-shell configuration that facilitates the transfer of thermal energy without mixing the heat-transfer fluids in the coolant subsystem 58 and the refrigerant subsystem 60.

The refrigerant subsystem 60, may include a compressor 80, a condenser 82, at least one cabin evaporator 84, the chiller 76, a first expansion device 86, a shutoff valve 87, a second expansion device 88, and a second shutoff valve 91. The compressor 80 pressurizes and circulates the refrigerant through the refrigerant subsystem 60. The compressor 80 may be powered by an electrical or non-electrical power source. A pressure sensor 95 may monitor the pressure of the refrigerant exiting the compressor 80.

The refrigerant exiting the compressor 80 may be circulated to the condenser 82 by one or more conduits. The condenser 82 transfers heat to the surrounding environment by condensing the refrigerant from a vapor to a liquid. A fan 85 may be selectively actuated to circulate airflow across the condenser 82 to further effectuate heat transfer between the refrigerant and the airflow. The fan 85 may be arranged to circulate air over the radiator 64 as well.

At least a portion of the liquid refrigerant that exits the condenser 82 may be circulated through the first expansion device 86 (depending upon the position of valve 87) and then to the evaporator 84. The first expansion device 86 is adapted to change the pressure of the refrigerant. In one embodiment, the first expansion device 86 is an electronically controlled expansion valve (EXV). In another embodiment, the first expansion device 86 is a thermal expansion valve (TXV). If the expansion device is an EXV, the shutoff valve can be omitted. The liquid refrigerant is vaporized from liquid to gas, while absorbing heat, within the evaporator 84. The gaseous refrigerant may then return to the compressor 80. The refrigerant subsystem may include an evaporator temperature sensor 89 that is electrically connected to the controller 78. The sensor 89 outputs a signal indicative of the evaporator temperature. The controller 78 may operate the system based on signals received from sensor 89. Alternatively, the valve 87 may be closed to bypass the evaporator 84.

Another portion of the liquid refrigerant exiting the condenser 82 (or all of the refrigerant if the valve 87 is closed) may circulate through the second expansion device 88 and enter the chiller 76 if the valve 91 is open. The second expansion device 88, which may also be an EXV or TXV, is adapted to change the pressure of the refrigerant. The refrigerant exchanges heat with the coolant within the chiller 76 to provide the chilled coolant to the battery 24 during a chiller mode.

The battery-cooling system 58 may be programmed to preferably cool the battery 24 via only the radiator 64 whenever possible, because cooling the battery with the radiator 64 may consume less energy than with the chiller 76, which may increase the range of the vehicle. There are many situations, however, where radiator cooling alone is insufficient to cool the battery 24. These situations include when the battery temperature or ambient-air temperature exceeds the predefined battery-coolant temperature and the ambient-air temperature, respectively, and when the load (discharge or recharge) on the battery causes the battery to generate more heat than can be dissipated with the radiator alone. Thus, in many situations, the chiller 76 must provide at least some of the cooling for the battery 24. The proportioning valve 66 is capable of routing ratios of coolant between the radiator and the chiller to effectuate cooling of the battery 24 in the most efficient manner while preventing relatively large discharge air temperature swings in the cabin. The proportioning valve 66 may be controlled by an algorithm that minimizes the step change of the air blown into the cabin by prioritizing cabin cooling and throttling coolant flow to the chiller based on AC capacity availability.

In systems in which the battery chiller is in fluid communication with the cabin AC system, as is the case in the illustrated embodiment, a potential for negatively affecting the temperature of the cabin air is possible if the AC system does not have enough capacity to cool both the cabin and the battery at their respective loads. For example, on a hot day, simultaneously cooling the battery and the passenger cabin via the AC system may cause the outlet temperature of the cabin evaporator 84 to increase beyond a target temperature, which causes the air blowing into the cabin to be warmer than that requested by the occupants. The occupants may find it dissatisfying when the cabin temperature is not conforming with the demand temperature. As such, carmakers must choose between satisfying cabin demands versus satisfying battery demands in situations in which the combined load exceeds the capacity of the refrigerant system.

In one embodiment, the system is designed to prioritize the cabin demand over the battery demand. Here, the controller 78 is configured to determine a total capacity of the AC system, the amount of the total capacity being used by the cabin evaporator (which may be called evaporator capacity), and a chiller capacity that is available to the chiller if needed. The chiller capacity is the reserve capacity of the refrigerant system to accept additional heat from the chiller. The chiller capacity is equal to the total system capacity minus the evaporator capacity. The controller 78 may be programmed to determine the chiller capacity as a function of the cabin thermal load, and a temperature differential between a target evaporator temperature and a measured evaporator temperature. The target temperature of evaporator 84 is based on the cabin temperature requested by the driver, ambient-air temperature, sun load, and climate-control mode. For example, if the driver requests a 21 degrees Celsius cabin temperature, the controller includes mapping indicating a target evaporator temperature of 2-9 degrees Celsius range with 6 degrees being a typical target evaporator value. The cabin thermal load is a function of the temperature of the ambient air and the speed of the cabin blower that circulates air over the evaporator 84. An example high load occurs when the blower is on HIGH and the ambient air is above 30 degrees Celsius, and an example low load occurs when the blower is on LOW and the ambient air is below 20 degrees Celsius. The thermal load could also be an equation that takes into account ambient-air temperate, sun load, cabin temperature setpoint, sun load, and the number of vehicle occupants.

The controller is further configured to route an appropriate amount of coolant through the chiller 76 in order to not exceed the chiller capacity. The valve 66 is used to control the percentage of coolant flowing to the chiller versus the percentage of coolant bypassing the chiller via the radiator loop. The capacity transferred through the chiller is directly proportional to the mass flow rate of coolant circulating through the chiller and the temperature of the coolant. Depending upon the condition of the cabin AC system 60, the proportioning valve 66 may send anywhere between zero and 100 percent of the coolant to the chiller based on battery demand and cabin demand. If no chiller capacity is available, the valve 66 routes 100% of the coolant to the radiator, and the battery-coolant system attempts to cool the battery using the radiator 64 in conjunction with the fan 85. In some instances, the radiator and fan may be unable to achieve a sufficiently low coolant temperature for a given battery load. To prevent overheating, the controller 78 may power limit the battery to prevent overheating.

Figure 3:
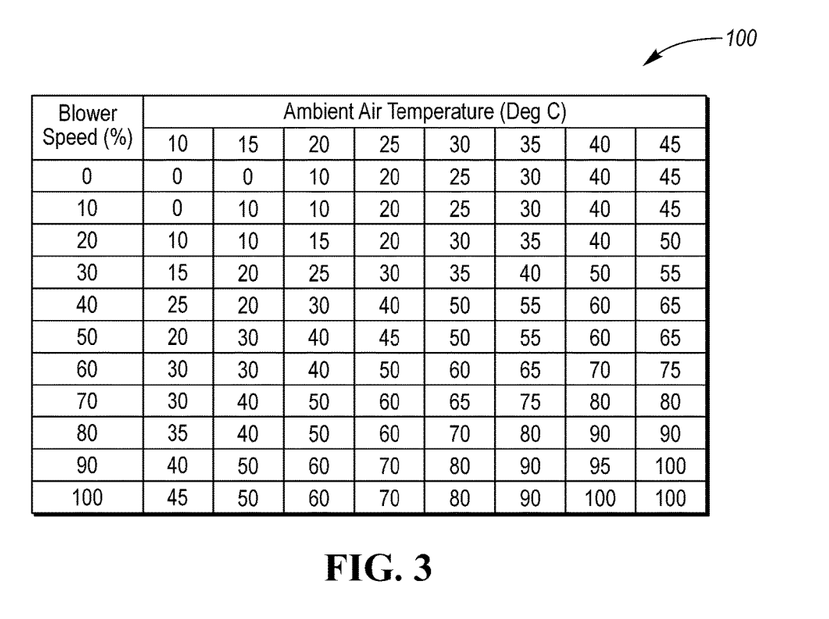
FIG. 3 is a table of climate load.

Referring to FIG. 3, an example load table 100 is shown. The load table 100 may be stored in memory of the controller 78. The controller 78 may include one or more load tables that are selectively used during different operating conditions. In the table 100, the load increases with increasing air temperatures and with increasing blower speeds. The blower speed may be represented as a percentage.

Figure 4:
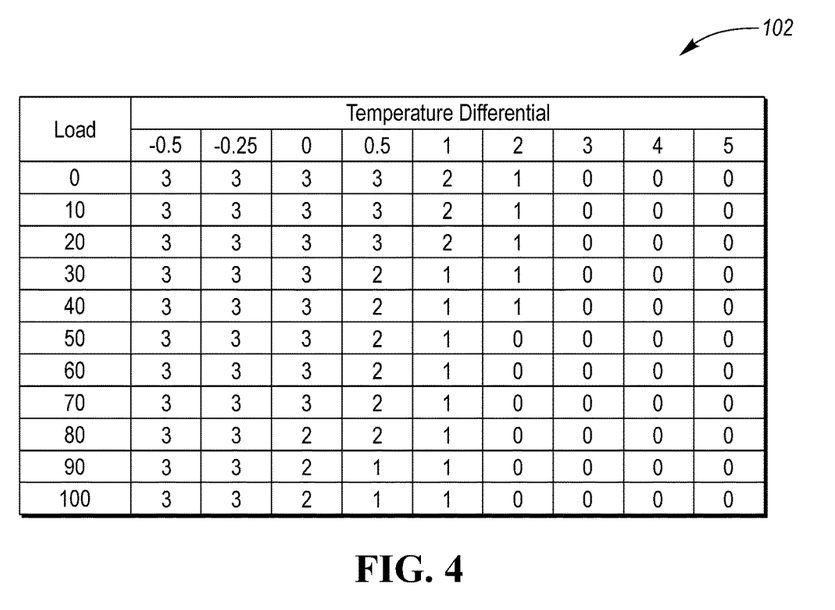
FIG. 4 is a table of chiller capacity.

Referring to FIG. 4, an example chiller-capacity table 102 is shown. The table 102 may be stored in memory of the controller 78. The controller 78 may include one or more tables that are selectively used during different operating conditions. The Y-axis is the load, which is determined using table 100 for example, and the X-axis is the temperature differential between the measured temperature of the evaporator 84 and the target temperature of the evaporator 84. Rather than expressing the capacity as a numerical value of capacity, table 102 categorizes the calculated chiller capacity into a plurality of predefined ranges and assigns each of the ranges a number. For example, the chiller capacity can be grouped into four ranges labeled zero, one, two, and three. The zeros correspond to no chiller capacity and the threes correspond to full chiller capacity. The ones and twos correspond to intermediate chiller capacities. Having four ranges is merely a non-limiting example; the system may include more ranges to increase the precision of control. The calibration tables can be interpolated in between points. So for example, chiller capacity is 0.5 when the evaporator error of 1.5 and the load 45. In some embodiments, algorithms executed by the controller 78 map the chiller capacity from table 102 with a valve position of the proportioning valve 66 that is calibrated to provide the desired amount of heat transfer (i.e., capacity) across the chiller 76. In other embodiments, the chiller capacity is used as a clip (or maximum opening). These embodiments will be explained in detail below.

Figure 5:
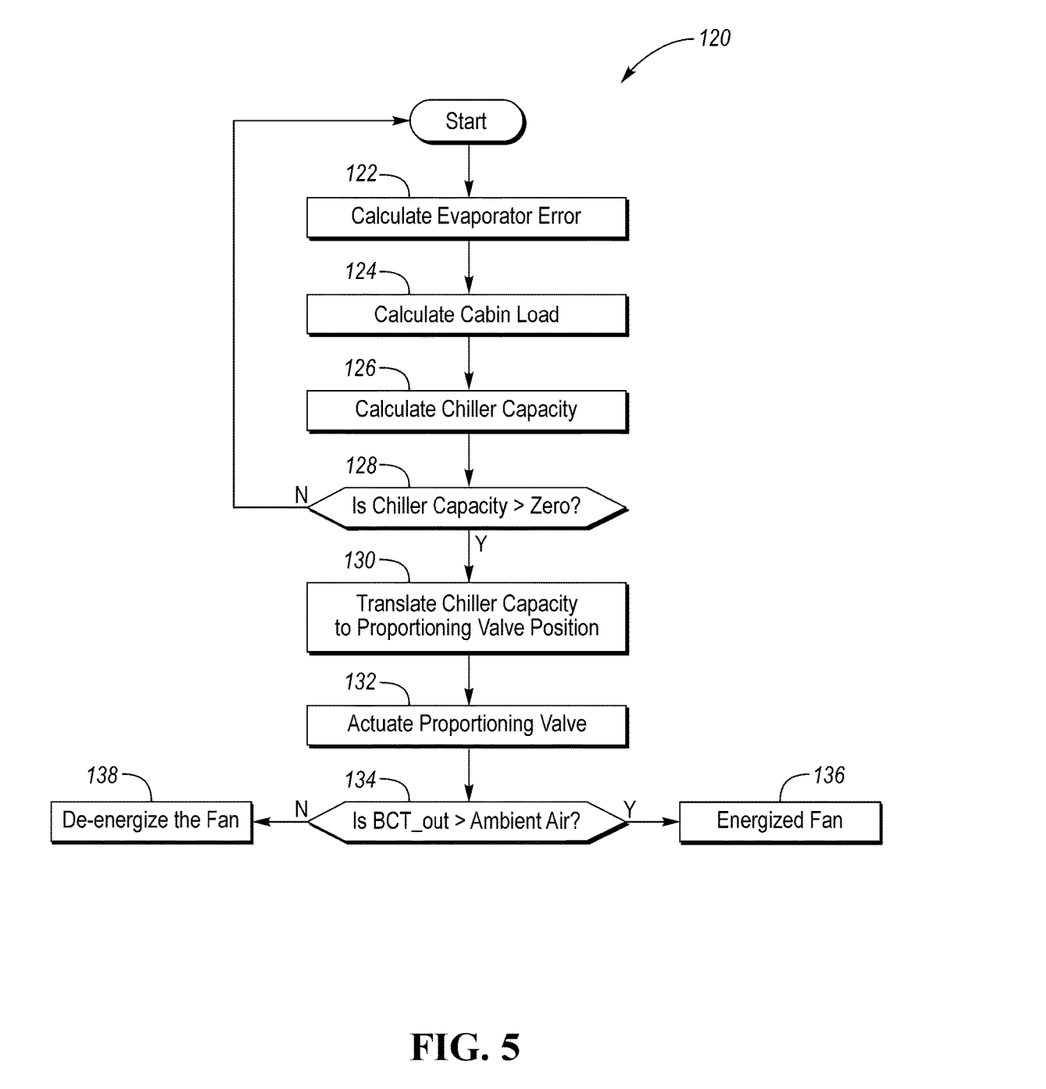
FIG. 5 is a flow chart for controlling the battery thermal-management system.

FIG. 5 illustrates a flow chart 120 of an algorithm for operating the proportioning valve 66 to achieve a desired chiller capacity. At operation 122 the controller calculates an evaporator error. The evaporator error is the temperature difference between the measured temperature (e.g., by sensor 89) of the evaporator 84 and a target temperature of the evaporator. At operation 124 the cabin load is calculated using table 100 for example. As described above, the cabin load is a function of the blower speed and the ambient-air temperature. At operation 126 the controller calculates the chiller capacity using table 102 for example. The chiller capacity is a function of the load and the evaporator error. At operation 128 the controller determines if the chiller capacity is greater than zero. If the chiller capacity is zero, the chiller cannot be used to cool the battery. As such, control loops back to the start. If the chiller capacity is greater than zero, control passes to operation 130 and the controller translates the chiller capacity to a position of the proportioning valve.

Translating chiller capacity to a position of the proportioning valve 66 can be done in several different ways. In a first embodiment, at least one of the predefined ranges (i.e., 1 and 2) may include a corresponding predefined position of the proportioning valve 66. For example, chiller capacities categorized as "one" correspond to a proportioning valve position that routes 25% of the coolant to the chiller and 75% of the coolant to the radiator. Chiller capacities categorized as "two" correspond to a proportioning valve position that routes 50% of the coolant to the chiller and 50% of the coolant to the radiator. These valve-position values are merely examples and are not limiting. When chiller capacity is three, the chiller capacity is more than enough to cool the battery and routing too much coolant through the chiller may overcool the battery. Thus, range 3 may not have a predefined valve position associated with it. Instead, when the capacity is three, the proportioning valve position may be controlled based on a difference between a target battery temperature and a measured battery temperature.

Figure 6:
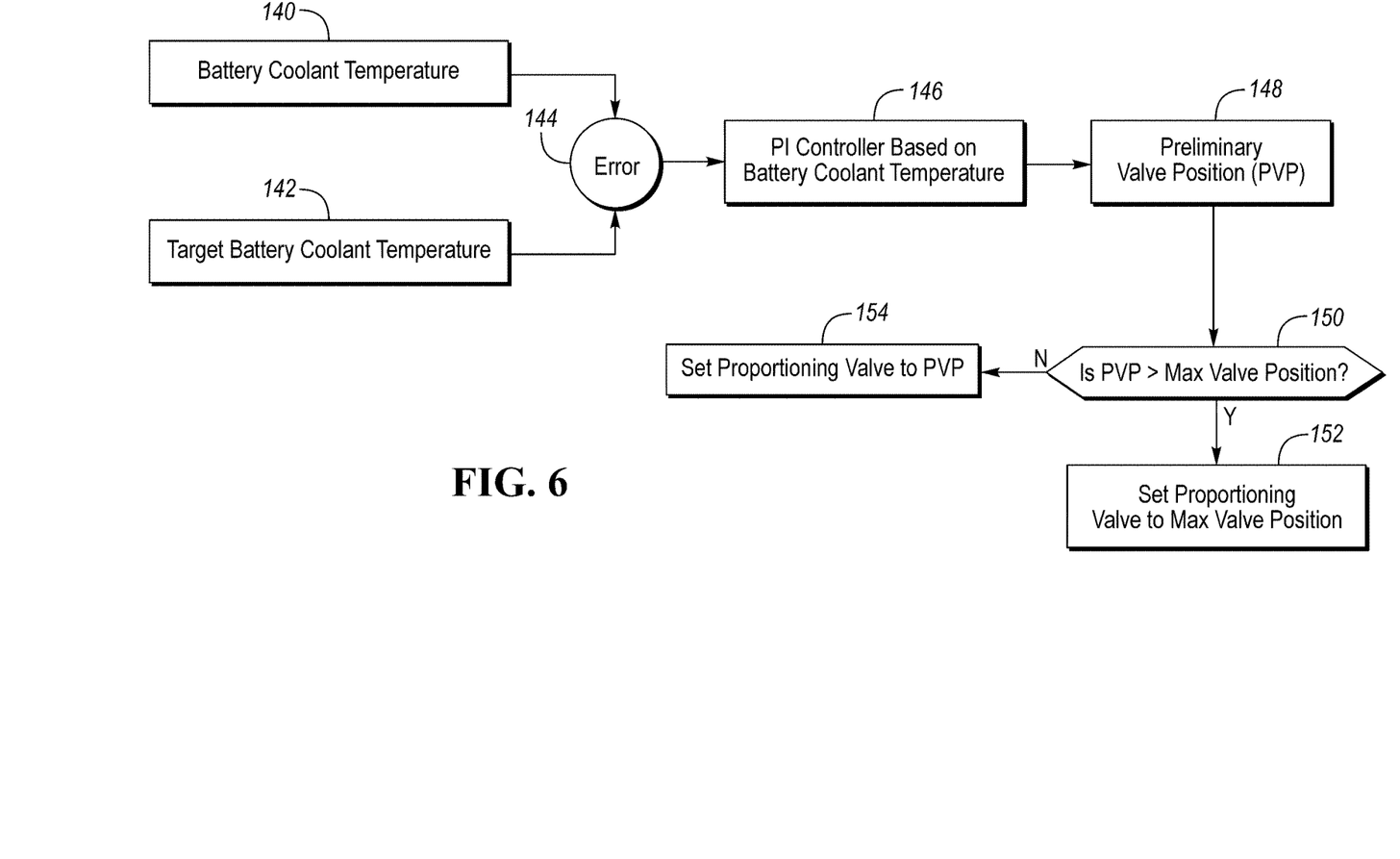
FIG. 6 is a flow chart for translating chiller capacity to a valve position of the proportioning valve.

In another embodiment, the proportioning valve position can be controlled using proportion integral (PI) control. Referring to FIG. 6, a module of the controller 78 receives a measured battery-coolant temperature 140 (e.g., signal from sensor 70 or 99) and a target battery coolant temperature 142. The target temperature 142 is set by the battery based on battery temperature, battery load, and ambient-air temperature. The measured temperature 140 is subtracted from the target temperature 142, or vice versa, to determine a temperature error 144. The error 144 is fed into a PI controller 146, which outputs a preliminary valve position (PVP) 148 of the proportioning valve 66 that is calculated to provide the desired battery temperature. The PVP 148 is determined without regard to the chiller capacity. As such, blindly actuating the valve to the PVP may negatively affect cabin-air temperature. To prevent this, the PVP is compared to, and if necessary clipped by, a maximum valve position of the proportioning valve. The maximum valve position is based on the chiller capacity as calculated by table 102 for example. At least one of the chiller-capacity ranges may have a corresponding maximum valve position which is calculated at operation 130. For example, the maximum valve position for range one is 25% of coolant to the chiller, and for range two is 50% of coolant to the chiller. Range 3 may not have an associated maximum valve position because the chiller capacity exceeds a maximum battery thermal load. Or range 3 may have a maximum valve position of 100%. At 150, the controller determines if the PVP is greater than the maximum valve position. If yes, the PVP is clipped and the proportioning valve is set to the maximum valve position at 152. If no, the proportioning valve is set to the PVP at 154.

Referring back to FIG. 5, at operation 132, the proportioning valve 66 is actuated to the position determined at step 152 or step 154. The proportioning valve 66 may be actuated by a stepper motor associated therewith or a similar mechanism. At operation 134, the controller determines if the battery-coolant temperature exiting the battery (e.g., signal from sensor 99) is greater than the ambient-air temperature. When the ambient-air temperature exceeds the battery-coolant temperature, the radiator is absorbing heat into the cooling system rather than expelling heat to the outside air. As such, the fan 85 is de-energized when the ambient air is hotter than the battery coolant temperature to reduce air flow through the radiator. If the ambient air temperature is colder than the battery-coolant temperature, the fan is energized at 136 to increase air flow through the radiator.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   a refrigerant system including a compressor, a condenser, a battery chiller, and a cabin evaporator;
   a coolant system including
      a proportioning valve including an inlet connected in fluid communication with an outlet side of the battery, and a pair of first and second outlets, wherein the valve is configured such that each of the outlets selectively receives a proportion of coolant flowing into the inlet depending upon a position of the valve,
      a chiller loop connected in fluid communication with the first outlet of the proportioning valve, and arranged to convey coolant between the battery and the chiller to transfer heat from the coolant system to the refrigerant system, and
      a radiator loop connected in fluid communication with the second outlet of the proportioning valve, and arranged to convey coolant between the battery and a radiator to transfer heat from the coolant system to the outside air; and
   a controller configured to, in response to the refrigerant system being ON, actuate the proportioning valve to proportion the coolant between the first and second outlets such that heat transfer through the chiller is limited to a chiller capacity and such that the proportion of the coolant circulated to the first outlet increases as the chiller capacity increases.

2. The vehicle of claim 1, wherein the controller is further configured to actuate the proportioning valve such that the proportion of the coolant circulated to the second outlet increases as the chiller capacity decreases.

3. The vehicle of claim 1, wherein the controller further includes memory in which the chiller capacity is categorized into a plurality of predefined ranges, and wherein at least one of the ranges includes a corresponding predefined position of the proportioning valve.

4. The vehicle of claim 3, wherein the controller is further configured to actuate the proportioning valve to a selected one of the predefined positions in response to the chiller capacity being within the predefined range corresponding to the selected one of the predefined positions.

5. The vehicle of claim 3, wherein for at least one of the predefined ranges, the proportioning valve is actuated based on an error between measured and target battery-coolant temperatures.

6. The vehicle of claim 1, wherein the controller further includes memory in which the chiller capacity is categorized into a plurality of predefined ranges, and wherein at least one of the ranges includes a corresponding maximum valve position.

7. The vehicle of claim 6, wherein the controller is further configured to command actuation of the proportioning valve such that the maximum valve position is not exceeded.

8. The vehicle of claim 1, wherein the chiller capacity is based on a temperature difference between a measured temperature of the cabin evaporator and a target temperature of the cabin evaporator.

9. A vehicle comprising:
   a refrigerant system including a battery chiller;
   a coolant system arranged to circulate coolant through the chiller and a radiator, and including a valve in fluid communication with the chiller and radiator; and
   a controller configured to, responsive to the refrigerant system being ON, actuate the valve to route a proportion of coolant to the chiller based on chiller capacity, wherein the proportion to the chiller increases as the chiller capacity increases.

10. The vehicle of claim 9 further comprising a traction battery in fluid communication with the battery chiller, the radiator, and the valve.

11. The vehicle of claim 10, wherein the controller is further configured to actuate the valve based on an error between a target battery coolant temperature and a measured battery coolant temperature.

12. The vehicle of claim 9, wherein the proportion of the coolant circulated to the radiator increases as the chiller capacity decreases.

13. The vehicle of claim 9, wherein the controller further includes memory in which the chiller capacity is categorized into a plurality of predefined ranges, and wherein at least one of the ranges includes a corresponding predefined position of the valve.

14. The vehicle of claim 9, wherein the refrigerant system further includes a cabin evaporator, and wherein the chiller capacity is based on a temperature difference between a measured temperature of the cabin evaporator and a target temperature of the evaporator.

15. The vehicle of claim 9, wherein the controller is further configured to actuate the valve to a primary valve position (PVP) based on an a difference between a target battery coolant temperature and a measured battery coolant temperature in response to the PVP being less than a maximum valve position that is based on the chiller capacity.

16. A method of controlling a thermal-management system of a traction battery, the method comprising:
   activating a refrigerant subsystem such that refrigerant circulates through a chiller and an evaporator;
   activating a battery-coolant subsystem such that coolant circulates through the traction battery, a radiator, the chiller, and a proportioning valve; and
   actuating the proportioning valve such that the coolant is proportioned between the radiator and chiller based on chiller capacity and the proportion of the coolant circulated to the radiator increases as the chiller capacity decreases.

17. The method of claim 16 further comprising actuating the proportioning valve such that the proportion of the coolant circulated to the chiller increases as the chiller capacity increases.

18. The method of claim 16 further comprising actuating the proportioning valve to a primary valve position (PVP) based on a difference between a target battery coolant temperature and a measured battery coolant temperature in response to the PVP being less than a maximum valve position that is based on the chiller capacity.

* * * * *